(12) United States Patent
Dekkers

(10) Patent No.: US 8,234,670 B2
(45) Date of Patent: Jul. 31, 2012

(54) VIDEO SYSTEM SHOWING ORIGINAL CHANNEL DURING ZAPPING ON A TV

(75) Inventor: Cees I. A. M. Dekkers, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 575 days.

(21) Appl. No.: 11/995,702

(22) PCT Filed: Jul. 18, 2006

(86) PCT No.: PCT/IB2006/052446
§ 371 (c)(1),
(2), (4) Date: Jan. 15, 2008

(87) PCT Pub. No.: WO2007/010477
PCT Pub. Date: Jan. 25, 2007

(65) Prior Publication Data
US 2008/0216124 A1    Sep. 4, 2008

(30) Foreign Application Priority Data
Jul. 19, 2005    (EP) ..................................... 05106598

(51) Int. Cl.
*H04N 5/445* (2011.01)
(52) U.S. Cl. ................. 725/43; 725/41; 725/61
(58) Field of Classification Search ................ 725/9, 13, 725/14, 61, 59, 34–49
See application file for complete search history.

(56) References Cited

U.S. PATENT DOCUMENTS

| | | | | |
|---|---|---|---|---|
| 4,959,719 A | * | 9/1990 | Strubbe et al. | 348/565 |
| 5,247,365 A | * | 9/1993 | Hakamada et al. | 348/732 |
| 5,818,541 A | * | 10/1998 | Matsuura et al. | 348/565 |
| 5,900,916 A | * | 5/1999 | Pauley | 725/59 |
| 6,563,547 B1 | | 5/2003 | Smith | |
| 6,956,623 B1 | * | 10/2005 | Staller | 348/731 |
| 7,047,548 B2 | * | 5/2006 | Bates et al. | 725/38 |
| 7,456,907 B2 | * | 11/2008 | Liebhold | 348/734 |
| 2002/0040475 A1 | * | 4/2002 | Yap et al. | 725/39 |
| 2002/0071031 A1 | * | 6/2002 | Lord et al. | 348/143 |
| 2004/0172651 A1 | * | 9/2004 | Wasilewski et al. | 725/46 |
| 2004/0177384 A1 | | 9/2004 | Kahn | |
| 2004/0255336 A1 | | 12/2004 | Logan | |

FOREIGN PATENT DOCUMENTS
WO    WO03003727 A1    1/2003
* cited by examiner

*Primary Examiner* — Pankaj Kumar
*Assistant Examiner* — Timothy Newlin
(74) *Attorney, Agent, or Firm* — Shimokaji & Assoc., PC

(57) ABSTRACT

The invention relates to a video system which is able to show more than one channel at the same time. If a user, after watching an original channel sufficiently long, zaps to another channel, the original channel is displayed in for example a PIP, together with the new channel in a main picture. After zapping yet to a third channel, the original channel is still displayed in the PIP. In this way, the user can keep track of the original channel while zapping other channels.

14 Claims, 3 Drawing Sheets

VIDEO SYSTEM SHOWING ORIGINAL CHANNEL DURING ZAPPING ON A TV

FIELD OF THE INVENTION

This invention relates to video systems arranged to simultaneously watch two or more channels. One main channel may be watched on a main part of the screen and the other channel(s) using for example Picture In Picture (PIP) or Picture Out of Picture (POP).

BACKGROUND OF THE INVENTION

In a picture-in-picture ("PIP") television receiver, the television takes video from at least two input sources and creates a single image. The image created by a PIP module is composed of a main part that occupies the full dimensions of the image, and one or more PIP parts that are scaled to occupy only a small portion of the overall image. The PIP part is typically wholly contained within the main part of the image. The PIP part of the image may be arbitrarily positioned anywhere within the main picture. The PIP part of the image may also be arbitrarily sized (or resized). In the multi-window display mode, also known in the television industry as picture-out-of-picture ("POP"), two or more non-overlapping display regions are arranged on the screen in a mosaic pattern. Each display region contains video from an independent video source, and can be of varying sizes or shapes. The preferred implementation of the multi-window feature limits the number of regions to two, equal-sized panels (panel 1 and panel 2) that are displayed side by side. In effect the screen is comprised of two main regions.

It often occurs that users, after watching a program on a certain channel for a while, want to temporarily watch one or more other channels. This habit is called 'zapping' channels. For example, when there is a commercial break on the original channel, the user may zap to other channels to catch some interesting bits of programs there. While zapping other channels, the user needs to check whether the commercial break has ended and if so, will resume watching the original channel.

U.S. Pat. No. 5,900,916 describes an apparatus for presentation of images from multiple sources on a monitor at the same time, wherein a main picture has overlayed on it a PIP occupying a minor portion of the main picture. In a so-called review mode, the PIP displays the channel which had been displayed on the main picture prior to the channel change. In this way, a user can watch the previous channel when zapping. When the user switches to yet another channel (i.e. a third channel), the original channel (i.e. the first channel) will not be displayed anymore. This means that when the user is zapping, for example during a commercial break on the original channel, he will not be able to notice the ending of the commercial break, since he can not see the original channel on the screen after two channel changes.

SUMMARY OF THE INVENTION

It is an object of the invention to provide a video system, which shows an original channel looked at by a user before a first channel change, together with a newly selected channel even after switching channels more than once.

This object is achieved by a video system comprising:
a first channel selection device arranged to receive a first plurality of channels and output a first output video corresponding to one of the first plurality of channels;

a second channel selection device arranged to receive a second plurality of channels and output a second output video corresponding to one of the second plurality of channels;

a display module arranged to provide simultaneously to a screen the first output video in a first part of the screen, and the second output video in a second part of the screen;

a control system arranged to receive input signals from a command input device, the control system further being arranged to control respective selections of the first and the second channel selection device, wherein after receiving an input signal indicative of a channel change from a first channel to a second channel, the control system will cause the channel selection devices and the display module to display the first channel in the first part of the screen (PIP) and the second channel in the second part of the screen, characterized in that the control system is arranged to define the first channel as being an original channel depending on a predetermined criterion, the control system after receiving yet another input signal indicative of a channel change from the second channel to a third channel, will if the first channel is defined as being the original channel, cause the channel selection devices and the display module to display the first channel in the first part of the screen and the third channel in the second part of the screen.

The advantage is that the user can see the content of the original channel while zapping other channels and that he does not need to regularly check the original channel.

In one embodiment, the video system comprises a timer arranged to count a period lapsed after a channel change, and the control system defines a channel as being an original channel if the period lapsed exceeds a certain threshold. In this way, the original channel is automatically defined.

In a further embodiment, the display module comprises a Picture In Picture (PIP) display module. In this embodiment, a user can see the original channel in a small window while (temporarily) watching another channel.

The invention also relates to a method of displaying video according to claim 12.

BRIEF DESCRIPTION OF THE DRAWINGS

Hereinafter, the invention will be explained with reference to some drawings, which are intended to illustrate the invention and not to limit its scope and in which.

DESCRIPTION OF PREFERRED EMBODIMENT

A "channel" means a discrete selection of displayable images, such as in a television system being television video signals (such as defined by a frequency or range of frequencies) or with graphics and/or text from a source such as the Internet (as defined by an address). Any mode of input may be utilized, for example, a television station, a cable system, satellite, a video tape recorder/player and DVD. A "monitor" means any display or device for the visual depiction of signals or information, such as a CRT in a television system or a display or monitor in a computer or similar system. The term covers any type of display or monitor, e.g., cathode ray tube (CRT), plasma display, flat panel, etc. In this description, the word "screen" is used to embrace all possible monitors plus any other means of displaying, such as projection screens where pictures are displayed on a surface (screen) using a projector.

Figure 1:
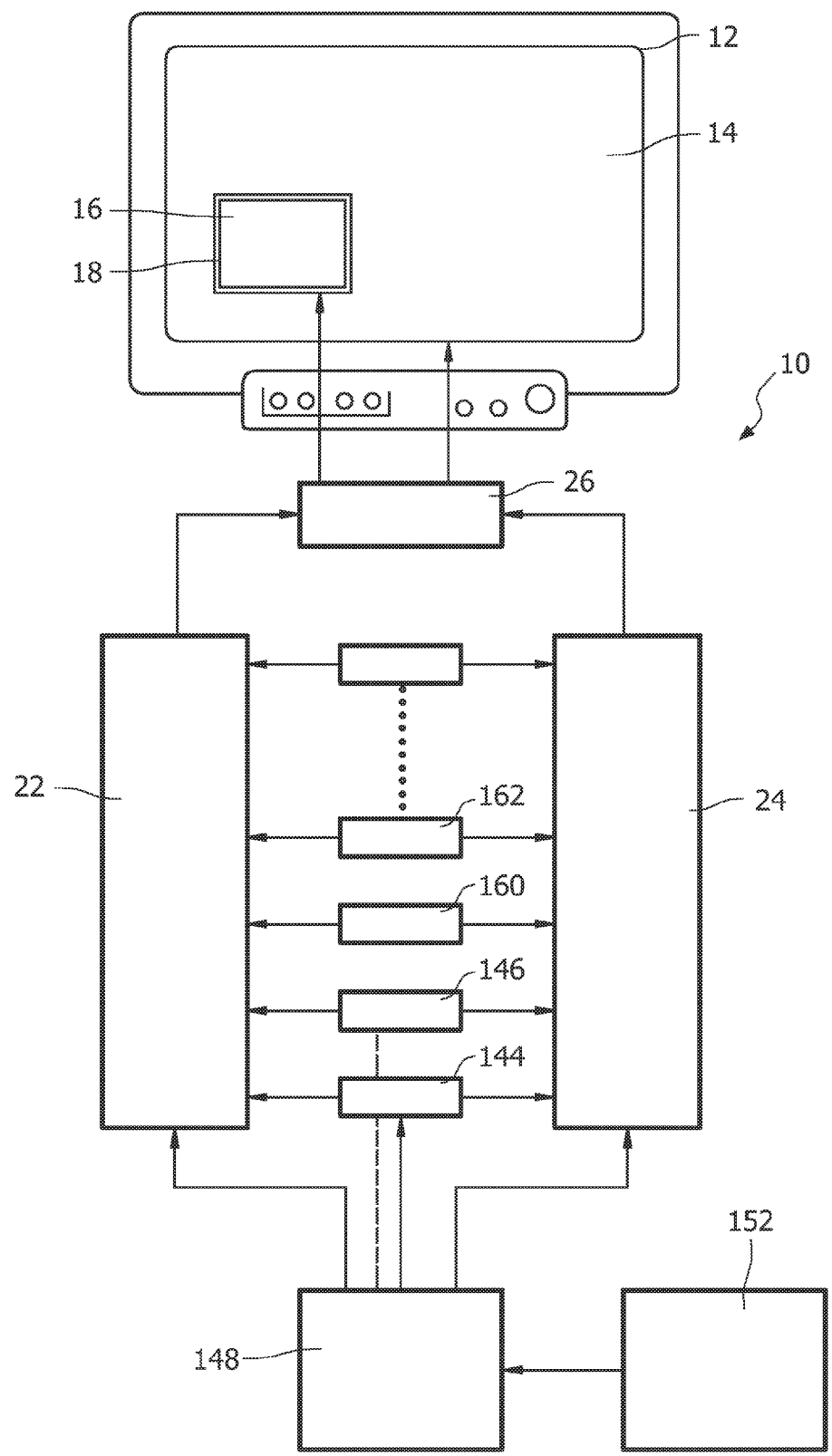
FIG. 1 schematically shows a schematic view of a system including a monitor having a PIP feature.

FIG. 1 shows a schematic representation of an embodiment of the invention. A video system 10 such as a television system comprises a monitor 12 which is operated in a mode so as to have a main picture 14 and a PIP 16 displayed thereon. The PIP 16 may for example be located in the lower left hand quadrant of the monitor 12, and may be disposed with a border 18 comprising a portion of the main picture 14 between the PIP 16 and a boundary of the monitor 12.

The video system 10 comprises two channel selection devices 22, 24 arranged to select a channel out of a plurality of inputs. The selected channels are input for a display module 26. The display module 26 may comprise a PIP processor and a video blender, not shown. The video system 10 comprises a control system 148, which is arranged to control the selections of the channel selection devices 22, 24. Furthermore, the control system 148 is arranged to control the display module 26. The main picture 14 and PIP 16 can receive various sources via the channel selection devices 22, 24. For example, a first tuner 144 and second tuner 146 may provide inputs respectively to main picture 14 and PIP 16. The control system 148 receives an input from a command input device 152 such as a remote control 152. The channel selection devices 22, 24 may also receive inputs from a video recorder 160, a DVD 162, or any other video source.

Figure 2:
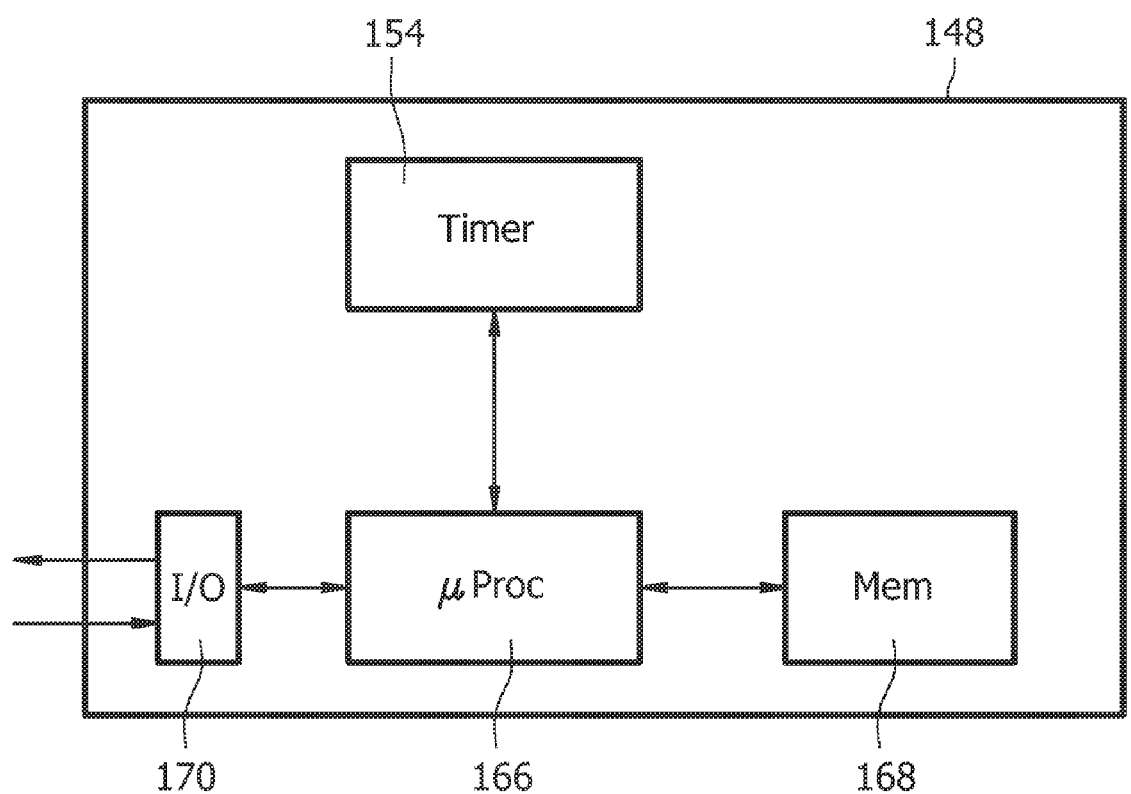
FIG. 2 schematically shows an embodiment of a control system.

FIG. 2 schematically shows an embodiment of the control system 148. The control system 148 may comprise a microprocessor 166, a memory 168 and a timer 154. The microprocessor 166 is arranged to store and load instructions from and to the memory 168. The memory 168 may comprise a software program giving the control system 148 the ability to execute different commands needed to control the video system 10. The processor 166 can be constructed using analogue, digital or software techniques or any desired combination thereof. The processor 166 can also consist of various sub-processing units. The control system 148 further comprises an I/O device 170 arranged to send and receive signals to and from the processor 166 and to and from the other components of the video system 10.

According to the invention, the control system 148 is arranged to determine whether a displayed channel is "the original" channel. The original channel is defined depending on a predetermined criterion. In an embodiment, if a channel is displayed sufficiently long enough, for example longer than 10 minutes, it is defined as the original channel. In this embodiment, the timer 154 is arranged to count a period lapsed after a channel change, and the microprocessor 166 is arranged to compare said period lapsed to a value stored in memory. Alternatively, a channel may be defined as being the original channel if the control system 148 has received an original channel input signal from the command input device 152, indicating that a presently displayed channel in a certain part of the screen is the original channel. So, in this embodiment, the user presses a button which functions as an indicator for the control system 148 that the presently watched channel needs to be stored in the memory 168 as the original channel. Then the user switches to another channel keeping the original channel in sight (i.e. in PIP 16). The control system 148 is arranged to keep track of a particular sequence of channels, by for example, storing identification codes of the different channels into the memory 168. An identification code of the original channel is also stored in the memory 168.

Figure 3:
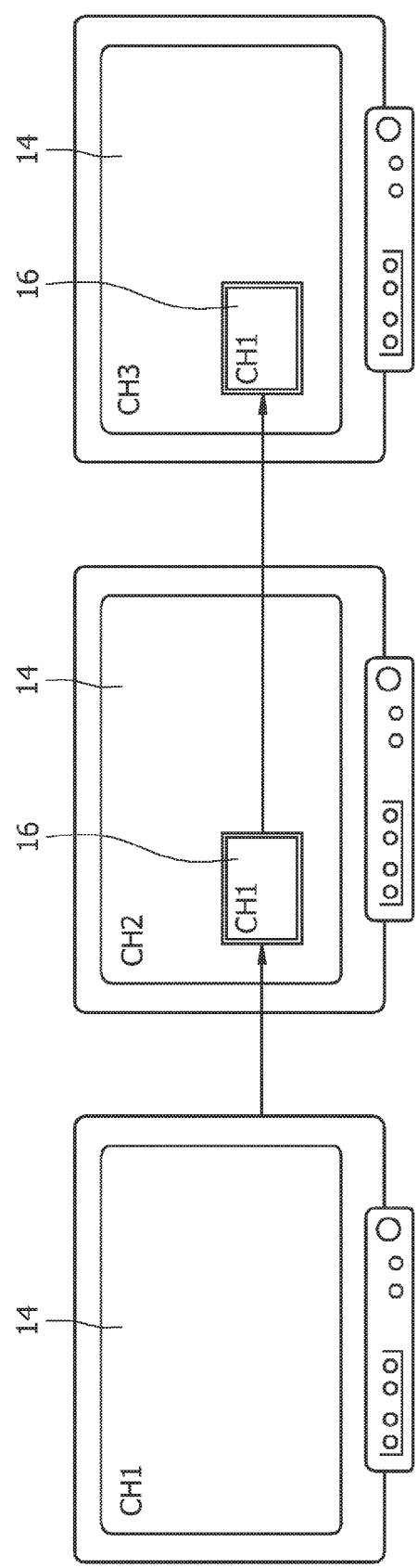
FIG. 3 shows a series of three images, intended to depict the same television system at three sequential stages of operation.

The principle of the invention will now be explained with reference to FIG. 3. FIG. 3 shows a series of three images, intended to depict the same television system at three sequential stages of operation. The initial configuration has a main picture on channel 1. When the main picture is caused to change, the control system 148 causes the content of the former main picture to be displayed as the PIP. So, after the first channel change, the main picture shows channel 2 and the PIP shows channel 1, see FIG. 3. If yet another channel change is initiated by a user, for example from channel 2 to channel 3, the control system 148 will cause the channel selection devices 22, 24 and the display module 26 to show channel 3 in the main picture and channel 1 in the PIP. In this way, irrespective of the sequencing of the main pictures, the PIP always displays the original channel (i.e. channel 1). So, if the user sees that something interesting occurs on the original channel, he may return to the original channel without missing too much of the action. returning to the original channel may be possible by pressing the appropriate channel button on the remote control. It is also possible to define a separate button on the remote control which says "back to original".

It should be noted that the channel displayed on the screen 12 can be TV channels received by tuners 144, 146, but may also be a video signal produced by the video recorder 160. The video recorder 160 may be an internal source, such as the video recorder 160, but may also be external from the video system 10. In that situation, the video system 10, for example a TV set, is arranged to receive input from an external video recorder. Instead of a video recorder, the external source may be any other type of video source such as a DVD, or an Internet channel.

In an embodiment, the PIP 16 showing the contents of the original channel will disappear when the user has watched another channel for a sufficiently long period, e.g. 10 minutes. It may then be assumed that the user wants to remain watching this new channel and does not want to return to the original channel. In this way the user does not need to end the PIP mode of the TV by hand, and the PIP will automatically disappear.

In the embodiments described above, the PIP function is automatically activated when a first channel change occurs and the predefined criterion is met. As an alternative, it may be possible to provide two options (e.g. on the remote control 152) to change the channel: one is the traditional channel change (e.g. P+ and P−) and the other option is a "channel change with PIP with the original channel". Thus then there is an explicit function to activate the PIP and change the channel.

The video system 10 may comprise a tuner, a Personal Video Recorder (PVR), a DVD, a VCR, etc. It should be noted that the video system 10 may well have means to communicate with the sources mentioned above, instead of incorporating them.

Instead of showing the original channel in a PIP, it may well be shown using a Picture Out of Picture (POP) function implemented in a POP display module. For example, the original channel can be shown in a left part of the screen 12, and the actual channel can be shown on the right part of the screen 12. Other configurations are possible.

In a special embodiment the video system 10 comprises a plurality of channel selection devices 22, 24, each arranged to receive a plurality of channels and output an output video corresponding to one of the plurality of channels. In this embodiment, the control system 148 is arranged to display a current channel together with a sequence of recently displayed channels in a plurality of parts of the screen.

For example, only those recently displayed channels are displayed together with the current channel which have been displayed (i.e. watched) longer than a predefined 'recent channel period'. Both PIP and POP functions can be used to display the respective channels on the screen 12.

Furthermore, the video system 10 may comprise a monitor 12. An example of this embodiment is a TV or a computer (e.g. a PC).

The invention also relates to a method of displaying video wherein a first channel is displayed on a screen, and then after an input signal indicative of a channel change from said first channel to a second channel is received, the first and second channel are displayed on the screen 12. Depending on a predetermined criterion, the first channel is defined as being the original channel. The criterion may be whether that channel is displayed longer than a threshold. If yet another input signal indicative of a channel change from the second channel to a third channel is received, the first channel (being the original channel) is displayed in the first part of the screen 12 and the third channel in the second part of the screen 12.

The present invention may be implemented as a computer program product stored on a computer readable storage medium, comprising computer readable program code means for causing a computer to perform the features described above. Such a computer program product may be directly loadable into the internal memory of a digital computer comprising software code portions for performing the features described above when said product is run on a computer.

While the invention has been described in connection with preferred embodiments, it will be understood that modifications thereof within the principles outlined above will be evident to those skilled in the art. The invention is not limited to the preferred embodiments but is intended to encompass such modifications. Furthermore, the invention is not restricted to power connections of televisions. The invention may also be used to power electrical displays, electrical lighting equipment or other electrical devices which can be mounted onto a wall and do need a power connection every now and then.

The invention claimed is:

1. A video system comprising:
   a first channel selection device arranged to receive a first plurality of channels and output a first output video corresponding to one of the first plurality of channels;
   a second channel selection device arranged to receive a second plurality of channels and output a second output video corresponding to one of the second plurality of channels, said second output video being different than said first output video;
   a display module arranged to provide simultaneously to a screen said first output video in a first part of said screen, and said second output video in a second part of said screen;
   a command input device configured to enable a user to select a channel to be displayed and to transmit this channel selection to a control system;
   said control system arranged to receive input signals from said command input device, said signals comprising channel selection information; and said control system further being arranged to control respective selections of said first and said second channel selection device,
   wherein upon receiving an input signal indicating a selection by the user of a second channel and thereby initiating a channel change from a first channel to a second channel, said control system will automatically cause said channel selection devices and said display module to display said first channel in said first part of said screen and said second channel in said second part of said screen,
   wherein said control system is arranged to define said first channel as being an original channel depending on a predetermined criterion, and
   wherein said control system upon receiving a second input signal (i) subsequent to receiving the first input signal and (ii) prior to the second channel (ii)(a) being defined by said control system as the original channel depending on the predetermined criterion and (ii)(b) replacing the first channel as the original channel, which second signal indicating a selection by the user of a third channel, different from the first channel, thereby initiating a channel change from said second channel to a third channel, will in response to said first channel being the original channel, automatically cause said channel selection devices and said display module to display said first channel in said first part of said screen and said third channel in said second part of said screen.

2. A video system according to claim 1, wherein said video system comprises a timer arranged to count a period lapsed after a channel change, and wherein said control system defines a channel as being an original channel if said period lapsed exceeds a certain threshold.

3. A video system according to claim 1, wherein said control system defines a channel as being the original channel if said control system has received an original channel input signal from said command input device, indicating that a presently displayed channel in a certain part of the screen is the original channel.

4. A video system according to claim 1, wherein after a channel change to a new channel, said control system will cause said channel selection devices and said display module to only display said new channel on said screen if said new channel is displayed longer than a predetermined time period.

5. A video system according to claim 1, wherein at least one of the first and second plurality of channels comprises a tuner.

6. A video system according to claim 1, wherein at least one of the first and second plurality of channels comprises a Personal Video Recorder.

7. A video system according to claim 1, wherein said display module comprises a Picture In Picture (PIP) display module.

8. A video system according to claim 1, wherein said display module comprises a Picture Out of Picture (POP) display module.

9. A video system according to claim 1, wherein said video system comprises a plurality of channel selection devices including said first and second channel selection device, each of said devices being arranged to receive a plurality of channels and output an output video corresponding to one of the plurality of channels, said control system being arranged to cause said channel selection devices and said display module to display a current channel together with a sequence of recently displayed channels in a plurality of parts of said screen.

10. A video system according to claim 9, wherein said recently displayed channels are displayed together with the current channel only if they have been displayed longer than a predefined recent channel period before said current channel was selected.

11. A video system according to claim 1, comprising a monitor.

12. A video system according to claim 1, wherein said control system upon receipt of said second input signal will cease to display said first channel if said first channel is not defined as being the original channel.

13. A method of displaying video comprising:
- displaying a first channel on a screen, said first channel being displayed only once;
- selecting by a user utilizing a user input device, a second channel to be displayed;
- receiving an input signal from the user input device, said signal indicating the selected second channel; thereby initiating a channel change from said first channel to the second channel;
- simultaneously displaying said first channel in a first part of said screen and said second channel in a second part of said screen;
- defining said first channel as being an original channel depending on a predetermined criterion;
- selecting by the user utilizing the user input device, a third channel to be displayed, wherein the third channel is different from the first channel;
- upon receiving a second input signal from the user input device (i) subsequent to receiving the first input signal and (ii) prior to the second channel (ii)(a) being defined as the original channel depending on the predetermined criterion and (ii)(b) replacing the first channel as the original channel, said second input signal indicating the selected third channel, initiating a channel change from said second channel to a third channel; and
- automatically displaying said first channel in said first part of said screen and said third channel in said second part of said screen in response to said first channel being the original channel.

14. The method of displaying video according to claim 13, wherein said automatically displaying step comprises not further displaying said first channel if said first channel was not defined as being the original channel.

* * * * *